United States Patent
Cherkasova et al.

(10) Patent No.: US 9,280,436 B2
(45) Date of Patent: Mar. 8, 2016

(54) MODELING A COMPUTING ENTITY

(75) Inventors: Ludmila Cherkasova, Sunnyvale, CA (US); Mehmet Kivanc Ozonat, Mountain View, CA (US); Brent A. Enck, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1941 days.

(21) Appl. No.: 12/486,326

(22) Filed: Jun. 17, 2009

(65) Prior Publication Data

US 2010/0324869 A1    Dec. 23, 2010

(51) Int. Cl.
  *G06F 17/50* (2006.01)
  *G06G 7/62* (2006.01)
  *G06F 11/34* (2006.01)

(52) U.S. Cl.
  CPC ........ *G06F 11/3409* (2013.01); *G06F 11/3442* (2013.01)

(58) Field of Classification Search
  USPC ........................................ 703/2, 13; 709/224
  See application file for complete search history.

(56) References Cited

U.S. PATENT DOCUMENTS

| | | | |
|---|---|---|---|
| 2003/0167296 A1* | 9/2003 | Todd, II .................. | 709/203 |
| 2004/0103181 A1* | 5/2004 | Chambliss et al. ......... | 709/223 |
| 2009/0106178 A1* | 4/2009 | Chu ......................... | 706/14 |
| 2010/0094592 A1 | 4/2010 | Cherkasova | |
| 2010/0094992 A1 | 4/2010 | Cherkasova | |

OTHER PUBLICATIONS

Marcos K. Aguilera et al, "Performance Debugging for Distributed Systems of Black Boxes," SOSP/03, 16 pages, Oct. 19-22, 2003.
Paul Barham, et al, "Using Magpie for request extraction and workload modelling," USENIX Association, ISDI'04: 6th Symposium on Operating Systems Design and Implementation, pp. 259-272, 2004.
BMCSoftware, BMC ProactiveNet Analytics, 2 pages (dated on or before Jun. 12, 2009).
Mike Y. Chen, et al "Path-Based Failure and Evolution Management," 14 pages, 2004.
Ira Cohen, et al, "Capturing, Indexing, Clustering, and Retrieving System History," Symposium on Operating Systems Principles, 2005, Oct. 23-26, 2005, 15 pages.
CA Wily Introscope, 2 pages (dated on or before Jun. 12, 2009).
Fred Douglis, et al, "Rate of Change and other Metrics: a Live Study of the World Wide Web" USENIX Symposium on Internetworking Technologies and Systems, Dec. 1997, pp. 1-13.
Nimsoft, Solutions, 4 pages (dated on or before Jun. 12, 2009).
Ninfang Mi, et al,"Analysis of Application Performance and Its Change via Representative Application Signatures", accepted in IEEE/IFIP Network Operations and Management Symposium (NOMS'08), Salvador, Brazil, pp. 216-223, 2008.
Christopher Stewart et al, "Exploiting Nonstationarity for Performance Prediction," EuroSys '07, Mar. 21-23, 2007, 14 pages.

(Continued)

*Primary Examiner* — Omar Fernandez Rivas
*Assistant Examiner* — Bernard E Cothran
(74) *Attorney, Agent, or Firm* — Trop, Pruner & Hu, P.C.

(57) ABSTRACT

To model a computing entity, information relating to transactions associated with the computing entity is received. The received information forms a collection of information. The collection is segmented into a plurality of segments, and at least one anomalous segment is identified. A model of the computing entity is built.

11 Claims, 4 Drawing Sheets

(56) References Cited

OTHER PUBLICATIONS

Qi Zhang, et al "A Regression-Based Analytic Model for Dynamic Resource Provisioning of Multi-Tier Applications," 4th International Conference on Autonomic Computing, Jun. 11-15, 2007, 11 pages.

Qi Zhang, et al, "R-Capriccio: A Capacity Planning and Anomaly Detection Tool for Enterprise Services with Live Workloads," Hewlett-Packard Development Company, L.P. HPL02007-87, 2007, 21 pages.

Raj Jain, "The Art of Computer Systems Performances Analysis: Techniques for Experimental Design Measurement Simulation and Modeling," Sep. 1991, pp. 570-579, John Wiley & Sons, New York, NY, 11 pages.

Ludmila Cherkasova, et al, "Anomaly, Application Change? or Workload Change Towards Automated Detection of Application Performance Anomaly and Change," 38th Annual IEEE/IFIP International Conference on Dependable Systems and Networks, DSN'2008, Jun. 24-27, 2008, pp. 1-10.

Ludmila Cherkasova, et al., "Dynamics and Evolution of Web Sites: Analysis, Metrics and Design Issues," 8 pages, 2001.

Ludmila Cherkasova, et al., "Measuring and Characterizing End-to-End Internet Service Performance," ACM Transactions on Internet Technology, vol. 3, No. 4, Nov. 2003, pp. 347-391.

Hewlett-Packard Company, "HP Diagnostics software for .NET; Data sheet," 2007, 4 pages.

Hewlett-Packard Company, "HP Diagnostics software for Siebel applications; Data sheet," 2007, 4 pages.

Hewlett-Packard Company, "HP End User Management software for .NET; Data sheet," 2007, 4 pages.

Quest Software, Inc., "PerformaSure—Java Application Performance Diagnostics," 2009, 2 pages.

Ramakrishnan Rajamony, et al., "Measuring Client-Perceived Response Times on the WWW," Mar. 2001, 12 pages.

Symantec, "Data Sheet: Application Performance Management; Symantec i3 for Oracle Applications," 2006, 4 pages.

Bhuvan Urgaonkar, et al., "An Analytical Model for Multi-tier Internet Services and Its Applications," Jun. 2005, 13 pages.

IBM, "Web Management solutions from Tivoli software," http://www-01.ibm.com/software/tivoli/solutions/web, printed Feb. 25, 2010, 2 pages.

"Network Capacity Planning/Resource Capacity Planning Tools/Network Utilization Trending/NetQoS," http://www.netqos.com/solution/capabilities/capacity_planning_trending.html, printed Feb. 25, 2010, 1 page.

Ludmila Cherkasova, et al., "Automated Anomaly Detection and Performance Modeling of Enterprise Applications," published Nov. 2009, 30 pages.

* cited by examiner

MODELING A COMPUTING ENTITY

BACKGROUND

Within an enterprise (such as a company, educational organization, government agency, and so forth), it is desirable that certain applications are consistently available and that they provide adequate performance. Examples of applications include web-based applications, storage applications, software applications, and so forth.

Monitoring and analysis of performance of applications can be time-consuming and labor-intensive for support personnel. For large projects, having to ensure that applications are available and performing adequately can sometimes involve great expense to the enterprise.

BRIEF DESCRIPTION OF THE DRAWINGS

Some embodiments of the invention are described with respect to the following figures.

DETAILED DESCRIPTION

I. Overview

To understand performance of an application (e.g., web-based application, software application, storage application, communications application, etc.) and to detect changes of interest in such performance, a modeling mechanism associated with the application is provided. The modeling mechanism can be used to diagnose performance changes in the behavior of the application and to provide feedback to application designers and service providers. The modeling mechanism is also able to create one or more models of the performance of the application. As used here, an "application" refers to any computing entity (software and/or hardware) that is able to perform tasks in response to a request.

Conventionally, preliminary performance profiling of an application is performed by using synthetic (simulated) workloads or benchmarks that are created to reflect a "typical" application behavior for "typical" transactions. While such performance profiling can be useful at the initial stages of design and development of a future system, the performance profiling may not be adequate for analysis of performance issues and observed application behavior in an existing production system (a system in which the observed application is being actively used).

First, an existing production system may experience a relatively different workload compared to the one that was used in a test environment. Second, frequent software releases and application updates may make it difficult and challenging to perform a thorough and detailed performance evaluation of an updated application. If a new application release or update causes performance to suffer, an enterprise (e.g., company, educational organization, government agency, etc.) may lose productivity and experience increased operating cost.

In accordance with some embodiments, the modeling mechanism is able to perform continual performance evaluation of an application to assist an enterprise in diagnosing changes in application performance in an online manner. The modeling mechanism provides a framework that enables automated detection of application performance changes and provides useful classification of possible root causes. It is noted that application performance changes of interest are those caused by a performance anomaly. A "performance anomaly" refers to a change in behavior of an application that cannot be explained by the observed application workload. For example, the observed application behavior may be a current CPU (central processing unit) utilization. A change in the current CPU utilization may not be consistent with the type and volume of transactions that are currently being processed by the application, where the type and volume of transactions may suggest a different level of CPU utilization than that observed. The performance anomaly of the application may result from an unrelated resource-intensive process that consumes system resources, or some unexpected application behavior caused by not-fully debugged application code.

Thus, a distinction is made between a performance anomaly and workload change. The performance anomaly is indicative of an abnormal situation that has to be investigated and resolved. On the contrary, a workload change (such as variations in transaction mix and load) is typical for an application. Thus, it is desirable to avoid providing false alarms raised by the modeling mechanism due to workload changes.

Another type of application performance change that is of interest includes a change caused by a change in the structure of the application itself, such as due to a new software release, a software update, or a change in hardware components. If the detected change indicates an increase in transaction processing time for the application, then an alarm can be raised to assess the amount of additional resources that are being consumed, and a feedback can be provided back to an application designer regarding the detected change such that the application designer can determine whether the change is acceptable or expected.

By performing continual performance evaluation of an application in accordance with some embodiments, a model (or models) of the application performance can be developed. One type of model can be a regression-based model that characterizes a resource consumption pattern of the application. Another type of model is based on providing application performance signatures that indicate a run-time behavior of the application. In some embodiments, the above two modeling techniques can be integrated to provide a more comprehensive solution. While the regression-based modeling algorithm can accurately detect a change in performance of the application such that appropriate alarms can be raised, the regression-based modeling algorithm may not be able to identify which of multiple transactions associated with the application is responsible of the change—the application performance signature approach can be used to perform this identification of a specific transaction (or transactions) that caused the change. A "transaction" refers to a collection of tasks performed by the application in response to a corresponding request (or group of requests).

Effective modeling of the application can also allow for more effective and efficient capacity planning and resource provisioning. For example, the model can be used to enable an application (or workload manager associated with the application) to request resources during execution of the application. As another example, the model can be used by an application designer or developer to develop software utilities for the application. An application designer or developer can also use the modeling framework according to some embodiments to perform future capacity planning and provisioning of resources in a system.

II. System Environment

Figure 1:
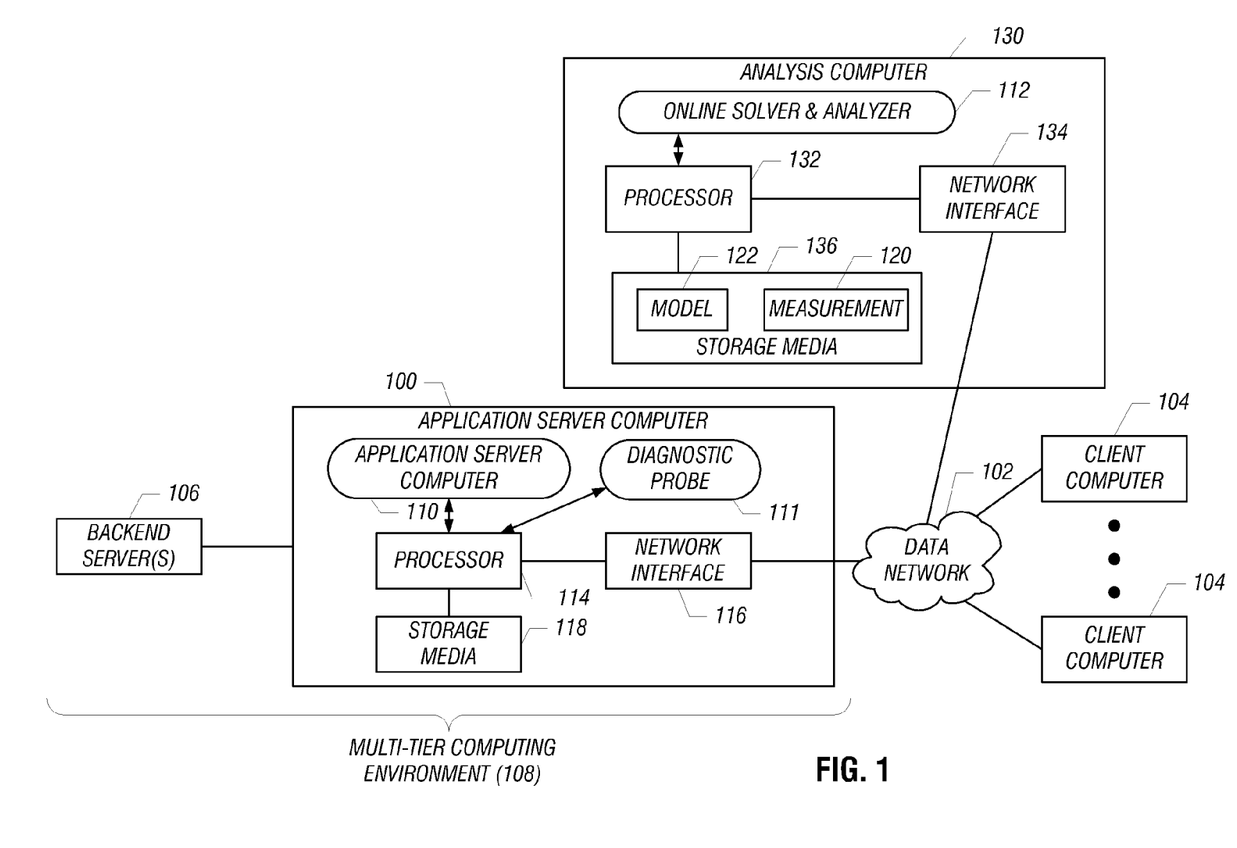
FIG. 1 is a block diagram of an exemplary arrangement in which an embodiment of the invention is incorporated.

FIG. 1 illustrates an exemplary arrangement that includes a server computer 100 connected over a data network 102 with one or more client computers 104. In addition, an analysis server 130 for performing tasks according to some embodiments is also connected to the data network 102. The client computers 104 are able to submit requests to the server computer 100. For example, the requests may be web requests for web pages. The server computer 100 processes the requests from the client computers 104 and provides response information, such as web pages back, to the client computers 104. In other examples, the client computers 104 may submit other types of requests, such as requests to execute application software, requests to store data, and so forth.

In the example of FIG. 1, the server computer 100 can be a frontend server (also referred to as an "application server") that interacts with client computers 104. The server computer 100 can in turn be connected to one or more backend server(s) 106 that performs additional tasks. For example, the backend server(s) 106 may be a database server(s). The backend server (s) 106 and the server computer 100 (frontend server) are part of a multi-tier computing environment 108. In a different arrangement, the server computer 100 does not have to be part of a multi-tier computing environment. Note also that there may be multiple server computers 100 (frontend servers) available to the client computers 104.

The server computer 100 includes application software 110 that provides application services in response to requests from the client computer 104. For example, the application software 110 may be a web server application, a storage application, a workload manager, and so forth.

The server computer 100 also includes a diagnostic probe 111 that is able to collect various performance metrics associated with execution of the application software 110. For example, the diagnostic probe 111 can collect metrics relating to a transaction count, transaction latency, utilization of resources, and so forth. Although the diagnostic probe 111 is shown as being part of the server computer 100, note that the diagnostic probe 111 can be located outside the server computer 100 in an alternative implementation. As yet another alternative, there can be multiple diagnostic probes.

The application software 110 and diagnostic probe 111 can be executable on a processor 114 in the server computer 100. The processor 114 is connected through a network interface 116 to the data network 102. In addition, the processor 114 is connected to storage media 118, which can be implemented with one or more disk-based storage devices and/or one or more integrated circuit (IC) or semiconductor storage devices.

The analysis computer 130 shown in FIG. 1 includes an online solver and analyzer 112. The diagnostic probe 111 in the application server computer 100 and the online solver and analyzer 112 in the analysis computer 130 are part of the modeling mechanism discussed above. The online solver and analyzer 112 is executable on a processor 132, which is connected to a network interface 134 and storage media 136 in the analysis computer 130.

The storage media 136 in the analysis computer 130 can be used to store measurement data 120 that can be collected by the diagnostic probe 111 in the application server computer 100 and forwarded to the analysis computer 130 over the data network 102. The measurement data 120 is processed by the online solver and analyzer 112 for the purpose of building a model (or models) 122 and performing anomaly detection. "Building" the model refers to either initially constructing the model or updating the model as further measurement data 120 is received.

In accordance with some embodiments, the processing performed by the online solver and analyzer 112 is in an online environment. In such an online environment, the online solver and analyzer 112 is able to update the model 122 as measurement data 120 associated with execution of an application is received. Performing the online processing allows for updates of the model 122 on a real-time basis, where the updating of the model on the real-time basis allows the model 122 to be updated as further measurement data 122 is received. The online solver and analyzer 112 can also detect a change in the application (such as a change caused by a software update or new release) in an online manner.

The measurement data 120 collected by the diagnostic probe 111 includes measurement data related to transactions of the application that is being observed (such as the application software 110). In the ensuing discussion, reference is made to client transactions and server transactions. In the context of a web-based application, a client transaction refers to a combination of all the processing activities at the server side (on the application server computer 100) for delivering an entire web page requested by a client. The web page includes a main HTML (Hypertext Markup Language) file as well as embedded objects, in addition to results of related database queries.

A server transaction refers to the dynamic processing performed by the application server computer 100 in response to a request from a client. In response to a request, the page content of a web page is generated by the application server computer 100 by using various applets or servlets (e.g., Java servlets) to incorporate customized data (such as data retrieved from a backend server 106). A server transaction is responsible for most of the latency and consumed resources for processing of client requests.

More generally, a "client transaction" refers to all the activities performed at the server computer 100 to produce a response to the client in response to a client request. A "server transaction" refers to the processing at the server computer 100 involved in acquiring data for inclusion in the response-note that a server transaction is part of the client transaction.

III. Regression-Based Modeling

In accordance with some embodiments, client transactions are used for constructing a resource consumption model of the application, while server transactions are used for producing application signatures during execution of the application to allow for detection of changes to the application (such as due to updates or new releases of the application).

The resource consumption model derived from client transactions in some embodiments is a regression-based model used to characterize a resource consumption pattern of the application. The regression-based model allows for automatic detection of a performance anomalies as well as changes to the application. A regression-based model refers to a model that is used to predict one variable from one or more other variables, where the model is derived based on past observed data.

Figure 2:
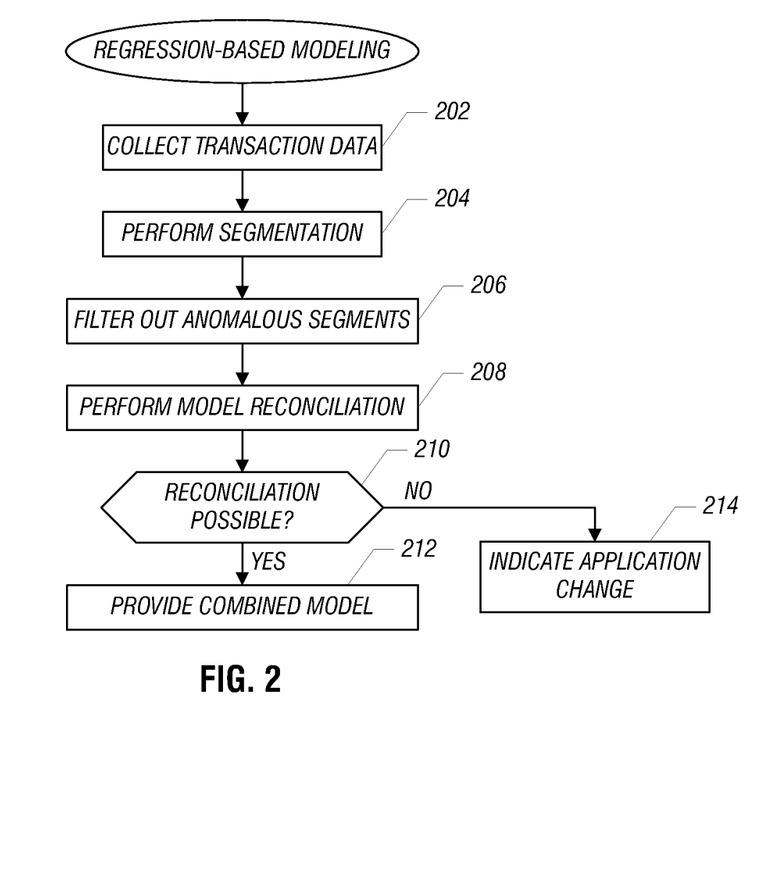
FIG. 2 is a flow diagram of a regression-based modeling algorithm according to an embodiment.

One embodiment of a process of building a regression-based model is shown in FIG. 2. As shown in FIG. 2, information relating to client transactions is collected (at 202) into a collection. In some embodiments, the collection can be a predefined time interval. Segmentation is then performed (at 204) to identify segments within the collection for which segment models can be developed. In some embodiments, the segments are time segments within the predefined time interval. The segment models for the corresponding segments can be regression models for the data within corresponding segments.

To provide an accurate regression-based model, it is desirable that time segments that are considered anomalous are removed from consideration in building the overall model. In accordance with some embodiments, time segments that are associated with performance anomalies are identified (at 206), and such time segments are removed (filtered) (at 208) for the purpose of constructing the regression-based model. Note that such identified anomalous segments can be recorded and provided to a user as feedback to allow the user to perform further analysis if desired.

Next, after filtering of the anomalous segments, model reconciliation is performed (at 210), in which an attempt is made to combine consecutive time segments (after removal of the anomalous segments) into a single model. It is determined (at 212) if reconciliation is possible (in other words, the reconciled or combined model is able to fit into a single overall model without producing an error outside of a predefined error threshold). If it is possible to reconcile the segments, then the combined regression-based model is provided (at 214). Note that in this scenario, the various segments that are combined can be associated with changes in workloads of the application (in other words, the differences between the segments are due to workload changes)—there has been no underlying change (update, modification, etc.) of the application itself in these segments.

However, if reconciliation is not possible, as determined at 212, then an indication is provided (at 216) that an application change has occurred. As a result, multiple distinct regression-based models are produced, where one regression-based model reflects the time segments prior to the change, and another regression-based model reflects the time segments after the change.

The accuracy of the regression-based model depends on the quality of measurement data used in the regression analysis: if the collected data contains periods of performance anomalies or periods when an updated application exhibits very different performance characteristics, then this can impact the derived transaction cost and can lead to an inaccurate regression-based model. As discussed above, segmentation (204) of an input collection of measurement data is first performed, and any anomalous segments are identified (206) and filtered (208) to provide a more accurate regression-based model.

Figure 3:
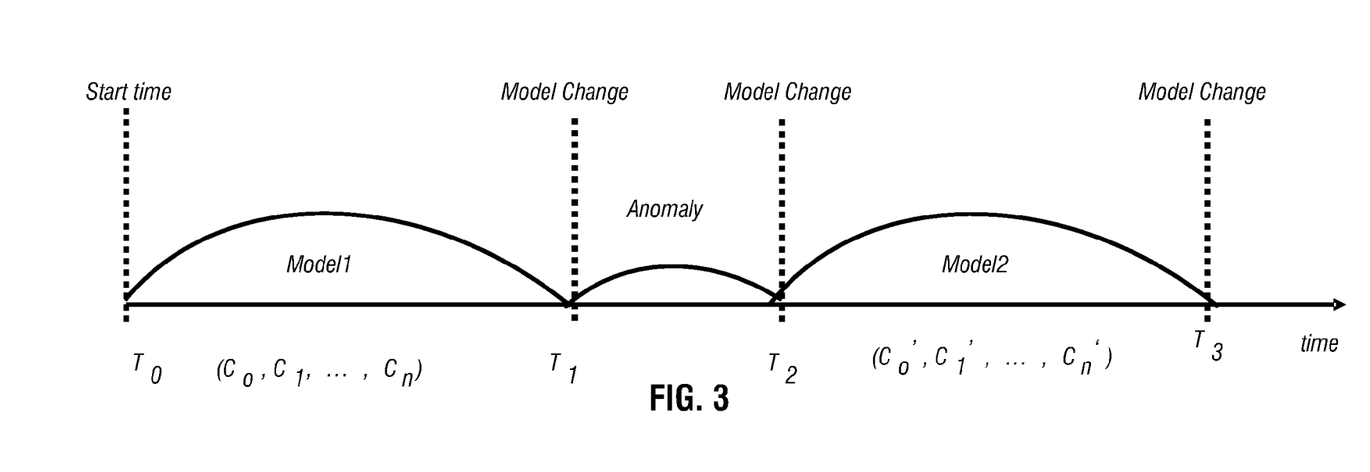
FIGS. 3 and 4 illustrate segmentation of a time interval associated with information relating to transactions of an application, in accordance with an embodiment.

In one embodiment, segmentation is performed by identifying time points when the transaction cost model exhibits a change. For example, as shown in FIG. 3, the following time segments are shown: $(T_0,T_1)$, $(T_1,T_2)$, and $(T_2,T_3)$, where $T_0$ represents the starting time, and each time point $T_1$, $T_2$, and $T_3$ represents a model change (where the model change can be caused by a workload change, an anomalous condition, a change to the application, and so forth).

In FIG. 3, the CPU costs of transactions $(Tr_1,Tr_2,\ldots,Tr_n)$ during the time segment $(T_0,T_1)$ are defined by a model $(C_0, C_1,C_2,\ldots,C_n)$. After that, in time segment $(T_1,T_2)$ there is not a single regression model that provides the transaction costs within a specified error bound. This time period is signaled as having anomalous behavior. As for time segment $(T_2,T_3)$, the transaction cost function is defined by a new model $(C_0',C_1', C_2',\ldots,C_n')$. Thus, in FIG. 3, time segment $(T_1,T_2)$ is considered to be an anomalous segment, while time segments $(T_0,T_1)$ and $(T_2,T_3)$ can be successfully modeled with corresponding segment models $(C_0,C_1,C_2,\ldots,C_n)$ and $(C_0',C_1', C_2',\ldots,C_n')$.

Figure 4:
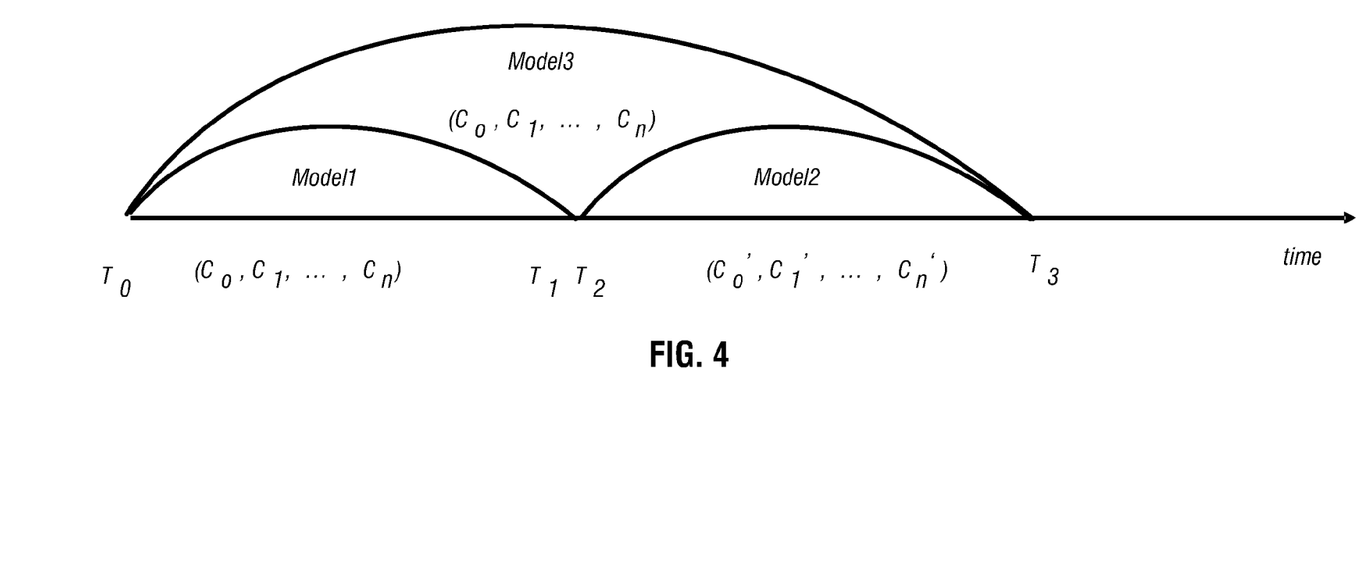

FIG. 4 illustrates removal of anomalous segment $(T_1,T_2)$. As a result of filtering out the anomalous segment $(T_1,T_2)$, time points $T_1$ and $T_2$ are collapsed to refer to the same time point.

The algorithm next attempts to perform model reconciliation (210 in FIG. 2). After anomalous segments have been filtered out, the algorithm attempts to unify the time segments that are not associated with an application change to form a single regression model—as shown in FIG. 4, if reconciliation is possible, then two different segments (models) are combined to form a new common model (Model 3). As shown in FIG. 4, time segment $(T_0,T_1)$ is modeled by a first regression model (Model 1) and time segment $(T_2,T_3)$ is modeled by a second regression model (Model 2).

The algorithm attempts to find a solution (Model 3) for combined transaction data in segments $(T_0,T_1)$ and $(T_2,T_3)$ within a given (predefined) error. If two models can be reconciled, then an observed model change is indicative of the workload change and not of the application change. The reconciled model is then used to represent application behavior across different workload mixes.

If the model reconciliation is not possible, then that means the different segment models (Model 1 and Model 2) describe different consumption models of the application over time, and is indicative of an actual application change.

Additional details regarding the regression-based modeling algorithm is provided below. The additional details are provided in the context of an example in which the regression-based model is based on utilization of a CPU. The regression-based model is used to model the CPU cost of transactions of the application. Note that in other implementations, the regression-based model can be represented by other parameters.

To capture the application behavior across time, a number of different client transactions (of the application) over a monitoring window t of fixed length L are observed. The terms "monitoring window t" or "time epoch t" are used interchangeably. The mix of transactions and resource utilizations are recorded at the end of each monitoring window.

Assuming that there are n transaction types, represented as $(Tr_1, Tr_2, \ldots, Tr_n)$, processed by the server computer 100 (FIG. 1), the following notations can be used:

$T_m$ denotes the overall time period for monitored behavior and $|T_m|$ denotes the cardinality of the overall time period $T_m$ (the number of time epochs in $T_m$);

$N_{i,t}$ is the number of transactions of the i-th type in the monitoring window t, where $1 \le i \le n$;

$U_{CPU,t}$ is the average CPU utilization of the server computer 100 during this monitoring window, where $t \in T_m$;

$D_i$ is the average CPU demand of transactions of the i-th type at the server computer 100, where $1 \le i \le n$; and $D_0$ is the average CPU overhead related to activities (other than activities relating to execution of the application) that allows the server computer 100 to continue running (e.g., operating system processes or background jobs that consume CPU time even when there are no application transactions in the system).

From the utilization law, one can obtain Eq. 1 for each monitoring window t:

$$D_0 + \sum_{i=1}^{n} N_{i,t} \cdot D_i = U_{CPU,t} \cdot L. \qquad \text{(Eq. 1)}$$

Let $C_{i,m}$ denote the approximate CPU cost of $D_i$ for $0 \leq i \leq n$ in the time segment $T_m$. Then, an approximate utilization $U'_{CPU,t}$ can be calculated as $$U'_{CPU,t} = C_{0,m} + \frac{\sum_{i=1}^{n} N_{i,t} \cdot C_{i,m}}{L}. \quad \text{(Eq. 2)}$$

In Eq. 2, $C_{0,m}$ represents the average CPU overhead related to idle system activities, such as operating system processes or system background jobs that consume CPU time even when there is no transaction in the system. To solve for $C_{i,m}$, one can choose a regression method from a variety of available methods. A typical objective for a regression method is to minimize either the absolute error or the squared error. In some implementations, the non-negative least squares regression (non-negative LSQ) method provided by MATLAB can be used to obtain $C_{i,m}$. This non-negative LSQ regression minimizes the error $$\epsilon_m = \sqrt{\sum_{t \in T_m} (U'_{CPU,t} - U_{CPU,t})^2},$$

such that $C_{i,m} \geq 0$.

When solving a large set of equations with collected measurement data over a large period of time, a naive linear regression approach would attempt to set non-zero values for as many transactions as it can to minimize the error when the model is applied to the training set. However, this may lead to poor prediction accuracy when the model is later applied to other data sets, as the model may have become too finely tuned to the training set alone. In statistical terms, the model may "overfit" the data if it sets values to some coefficients to minimize the random noise in the training data rather than to correlate with the actual CPU utilization. To create a model which utilizes only the statistically significant transactions, a stepwise linear regression method can be used to determine which set of transactions are the best predictors for the observed CPU utilization.

The algorithm initializes with an "empty" model which includes none of the transactions. At each following iteration, a new transaction is considered for inclusion in the model. The best transaction is chosen by adding the transaction which results in the lowest mean squared error when it is included.

For each $N_i (0 \leq i \leq n)$ the algorithm tries to solve the set of equations in the following form:

$$D_0 + N_{i,t} \cdot D_i = U_{CPU,t} \cdot L, \quad \text{(Eq. 3)}$$

while minimizing the error:

$$\epsilon_i = \sqrt{\sum_{t \in T_m} (U'_{CPU,t} - U_{CPU,t})^2},$$

Once this procedure is performed for all the transactions, the transaction $N_k (0 \leq k \leq n)$ which results in the lowest mean squared error is selected, such that $$\epsilon_k = \min_{0 \leq i \leq N} \epsilon_i.$$

Then, transaction $N_k$ is added to the empty set. After that, the next iteration is repeated to choose the next transaction from the remaining subset to add to the set in a similar way.

Before the new transaction is included in the model, it has to pass an "F-test," which refers to a test that determines if including the extra transaction results in a statistically significant improvement in the model's accuracy. If the F-test fails, then the algorithm terminates since including any further transactions cannot provide a significant benefit. The coefficients for the selected transactions are calculated using the linear regression technique described above. The coefficient for the transactions not included in the model is set to zero.

The above has described one exemplary implementation of a regression-based model that can be used in some embodiments.

The following provides further details regarding performing segmentation (204 in FIG. 2). The segmentation performed at 204 attempts to find an optimal segmentation. In performing optimal segmentation, time points are identified where the transaction cost model exhibits a change. In other words, a given time interval T is divided into time segments $T_m (T = \cup T_m)$, such that within each time segment $T_m$ the application resource consumption model and the transaction costs are similar.

In some embodiments, a cost-based statistical learning algorithm can be used to divide the given time interval T into segments. The algorithm is composed of two tasks:
  (1) construction of weights for each time segment $T_m$; and
  (2) dynamic programming to find the optimum segmentation (that covers a given time interval T) with respect to the weights.

The algorithm constructs an edge with a weight, $w_m$, for each possible time segment $T_m \subseteq T$. This weight represents the cost of forming the segment $T_m$. Intuitively, the weight $w_m$ is set to be small if the resource cost of transactions in $T_m$ can be accurately approximated with the same regression model, and to be large if the regression model has a poor fit for approximating the resource cost of all the transactions in $T_m$.

In one implementation, the weight function, $w_m$ can be selected as a Lagrangian sum of two cost functions: $w_{1,m}$ and $w_{2,m}$. The function $w_{1,m}$ is the total regression error over the time segment $T_m$:

$$w_{1,m} = \sqrt{\sum_{t \in T_m} (U'_{CPU,t} - U_{CPU,t})^2},$$

The function $w_{1,m}$ is thus computed based on utilizations of the CPU by transactions in time segment $T_m$.

The function $w_{2,m}$ is a length penalty function, which penalizes shorter time intervals to avoid dividing the given time interval T into segments of very short length (since the regression error can be significantly smaller for a shorter time segments). The value of the function $w_{2,m}$ decreases as the length of the segment $T_m$ increases. In one implementation, the function $w_{2,m}$ is defined as the entropy of segment length:

$$w_{2,m} = -(|T_m|) \cdot \log(|T_m|/|T|)$$

A goal according to some embodiments is to divide the given time interval T into time segments $T_m (T = \cup T_m)$ that minimize the Lagrangian sum of $w_{1,m}$ and $w_{2,m}$ over the considered segments—in other words, the segmentation minimizes:

$$W_1(T) + \lambda W_2(T) \quad \text{(Eq. 4)}$$

where the parameter $\lambda$ is the Lagrangian constant that is used to control the average regression error $\epsilon_{allow}$ (averaged over T) allowed in the model, and $$W_1(T) = \sum_m w_{1,m} \text{ and } W_2(T) = \sum_m w_{2,m}. \quad \text{(Eq. 5)}$$

A formal description of the algorithm is provided as follows. The set of all possible segmentations of T into segments is denoted by S. For instance, for T with three time segments, $t_1, t_2, t_3$, S would have 4 elements: $(t_1, t_2, t_3)$, $(t_1 \cup t_2, t_3)$, $(t_1, t_2 \cup t_3)$, and $(t_1 \cup t_2 \cup t_3)$. Each element of the set S is made up of segments ($T_m$'s). For instance, $(t_1, t_2 \cup t_3)$ includes segments $t_1$ and $(t_2 \cup t_3)$.

A goal of the algorithm is to divide the given time interval T into time segments to minimize the Lagrangian sum of $w_{1,m}$ and $w_{2,m}$ over the considered segments; in other words, the goal is to find the segmentation $$s^* = \arg\min_{s \in S} W(s) = W_1(s) + \lambda W_2(s).$$

where $\lambda$ is the fixed Lagrangian constant, s denotes an element of S, and $$W_1(s) = \sum_{T_m \in s} w_{1,m}$$

$$W_2(s) = \sum_{T_m \in s} w_{2,m}$$

The segmentation algorithm is first provided for a fixed value $\lambda$. In the segmentation algorithm, l represents the index of the time epoch, where the time epochs are denoted by $t_1$. Segments are represented using the following form: $[t_j, t_k]$, which indicates the segment that extends from time epoch $t_j$ to time epoch $t_k$. A parameter $W^{t_l}$ denotes the minimum Lagrangian weight sum for segmentation of the first l time points $(t_1, t_2, \ldots t_l)$.

The algorithm has the following five tasks.
1. Set $W^{t_1} = 0$, and set $l=2$.
2. For $1 \leq j \leq l$, set $w_{1,[t_j,t_k]}$ to the total regression error when a regression model is fit over the time samples in the segment $[t_j, t_k]$, then set $$w_{2,[t_j,t_k]} = -|t_k - t_j| \log(|t_k - t_j|/T)$$

and set $$w_{[t_j,t_k]} = w_{1,[t_j,t_k]} + \lambda w_{2,[t_j,t_k]}$$

3. Set $W^{t_l} = \min_{1 \leq j \leq l-1}(W^{t_j} + w_{[t_j,t_l]})$
4. Set $j^* = \arg\min_{1 \leq j \leq l-1}(W^{t_j} + w_{[t_j,t_l]})$
5. Then the optimum segmentation is the segmentation result for $j^*$ (already obtained in previous iterations) augmented by the single segment from $j^*$ to l.
6. Set $l=l+1$, and return to task 2.

In the algorithm above, task 2 sets the values for the $w_1$, $w_2$ and w terms, and step 3 and step 4 apply dynamic programming to find the minimum cost $W^l$ of segmentation up to the l-th time sample.

The algorithm above shows the best segmentation for a fixed value of $\lambda$.

An additional sequence of tasks to find the appropriate value of $\lambda$ for use in the algorithm is described as follows. In one implementation, an allowable regression error $\epsilon$ is set (which is typically provided by the service provider). The algorithm then seeks the value of $\lambda$ that gives the best segmentation for that allowable error $\epsilon$ by iterating over different values of $\lambda = \lambda_0, \lambda_1, \ldots, \lambda_k$.

In particular, if the algorithm for $\lambda_0 = 1$ results in the optimal segmentation with regression error greater than $\epsilon$, then the algorithm chooses $\lambda_1 = 2 \cdot \lambda_0$, and the segmentation algorithm is repeated. Once the algorithm finds a value $\lambda_k$ that results in the optimal segmentation with regression error smaller than $\epsilon$, then the algorithm uses a binary search between values and $\lambda_{k-1}$ and $\lambda_k$ to find the best value of $\lambda$ for a use in the segmentation algorithm with a given allowable regression error $\epsilon$.

The following describes additional details for identifying and filtering out anomalous segments (206 and 208 in FIG. 2). For example, an anomalous time segment is one where observed CPU utilization cannot be explained by an application workload (e.g., measured CPU utilization can not be accounted for by the transaction CPU cost function). This may happen if unknown background process(es) is using the CPU resource either at a constant rate (e.g., using 40% of the CPU at every time segment during some time interval) or randomly (e.g., the CPU is consumed by the background process at different rates at every time segment). It is desired to be able to detect and filter out the segments with anomalous behavior as otherwise the anomalous time segments will corrupt the regression estimations of the time segments with normal behavior. Furthermore, detecting anomalous time segments provides an insight into possible problems such that the problems can be corrected.

Consider a time segment $T_m$—the time segment $T_m$ is anomalous if one of the following conditions occurs:
   (1) The constant coefficient, $C_{0,m}$, (as used in Eq. 2 above) is large. Typically, $C_{0,m}$ is used in the regression model to represent the average CPU overhead related to idle system activities, such as operating system processes or system background jobs that consume CPU time even when there is no transaction in the system. The estimate for the idle system CPU overhead over a time segment is set by the service provider. When $C_{0,m}$ exceeds a predefined threshold, a time segment $T_m$ is considered as anomalous.
   (2) The segment length $T_m$ is shorter than some predefined time segment length threshold, which indicates that a model does not have a good fit in the segment that achieves an allowed error threshold.

Intuitively, the same regression model should persist over the entire time interval between application changes unless some anomalous event occurs that changes the application consumption model and manifests itself as model changes.

IV. Transaction Signature Modeling

In addition to performing regression-based modeling as discussed above, application transaction signature modeling that provides a complement to the regression-based modeling can also be performed in some embodiments.

To enable transaction signature modeling, information relating to transaction latency is collected by the diagnostic probe 111 of FIG. 1. The transaction latency refers to waiting and service times associated with performing a transaction at the server computer 100. In a multi-tier computing environment (such as 108 in FIG. 1), the latency includes waiting and service times associated with each of the tiers of the multi-tier computing environment (e.g., waiting and service times at the server computer 100, waiting an service times at the backend server(s) 106, and so forth).

Let $R_i^{front}$ and $R_i^{DB}$ be the average latency for the i-th transaction type at the frontend and backend servers, respectively. The transaction latency can then be calculated as follows:

$$R_i = R_i^{front} + R_i^{DB} = \qquad\qquad\text{(Eq. 6)}$$

$$= R_i^{front} + \frac{\sum_{j=1}^{P_i} N_{i,j}^{DB} * R_{i,j}^{DB}}{N_i}$$

In Eq. 6, $N_{i,j}^{DB}$ represents the number of calls (requests) made by the server computer 100 to a backend server 106 for each type j of outbound call. $R_{i,j}^{DB}$ represents the average latency for each type j of outbound call to a backend server 106. $P_i$ represents the total number of types of outbound calls to the backend server for the i-th transaction.

In accordance with some embodiments, a representative application transaction signature that compactly reflects performance characteristics of the application is provided. Transaction service times can be computed using measured transaction latencies and corresponding system utilization. For a given transaction type i, a relationship is defined based on transaction service time, $S_i$, transaction residence time $R_i$, (measured at the frontend server), and utilization U of the system (the frontend server):

$$R_i = S_i/(1-U) \qquad\qquad\text{(Eq. 7)}$$

Eq. 7 is equivalent to $$S_i = R_i * (1-U) \qquad\qquad\text{(Eq. 8)}$$

In a production system, measured latencies are collected for each transaction type i over different monitoring windows. As a result, there are multiple equations that reflect transaction latencies at different CPU utilization points as shown below:

$$S_i = R_{i,1}^{front} * (1-U_1/100)$$

$$S_i = R_{i,2}^{front} * (1-U_2/100) \qquad\qquad\text{(Eq. 9)}$$

In some embodiments, a solution that is the best fit for Eq. 9 is found. In one implementation, a linear regression-based (LSR) method can be used to solve for $S_i$.

Figure 5:
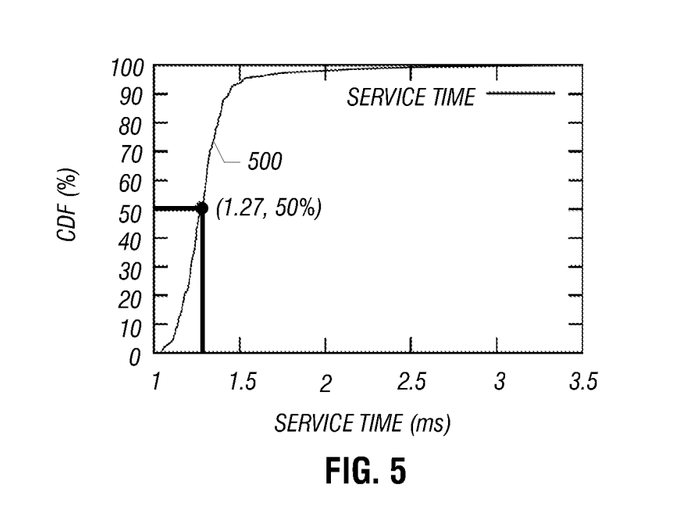
FIG. 5 is a graph of a function to enable computation of a transaction signature according to an embodiment.

In a different implementation, another method can be used to compute the service time $S_i$ for the i-th transaction type. By solving $S_{i,k} = R_{i,k}^{front} * (1-U_k/100)$ in Eq. 9, a set of solutions $S_i^k$ is obtained for different utilization points $U_k$ in the transaction latency profile. A cumulative distribution function (CDF) for $S_i$ is computed. Intuitively, since each transaction type is uniquely characterized by its service time, then it is expected that a curve (500) as shown in FIG. 5 represents the CDF for $S_i$, where the curve 500 has a large number of similar points in the middle and some outliers in the beginning and the tail of the curve. In some embodiments, the 50-th percentile value can be selected as the solution for $S_i$ as most representative.

Given the above representation of $S_i$, an application performance signature is defined as follows:

$$Tr_1 \to S_1$$

$$Tr_2 \to S_2$$

$$Tr_n \to S_n$$

Such an application signature uniquely reflects the application transactions. The CPU demand of the transactions is invariant for different workload types. Thus, the application signature compactly represents a model of application runtime behavior.

Continual calculation of the application signature allows for detection of such events as application changes (e.g., due to software update or new release) that may affect transaction execution time. By comparing the new application signature against the old application signature, transaction performance changes can be detected.

Also, since the application performance signature has separate values for corresponding different transactions ($S_1$, $S_2$, ..., $S_n$), once an application change is detected based on comparing application performance signatures, the separate values for corresponding different transactions can be used to identify which specific transaction(s) contributed to the application change.

Figure 6:
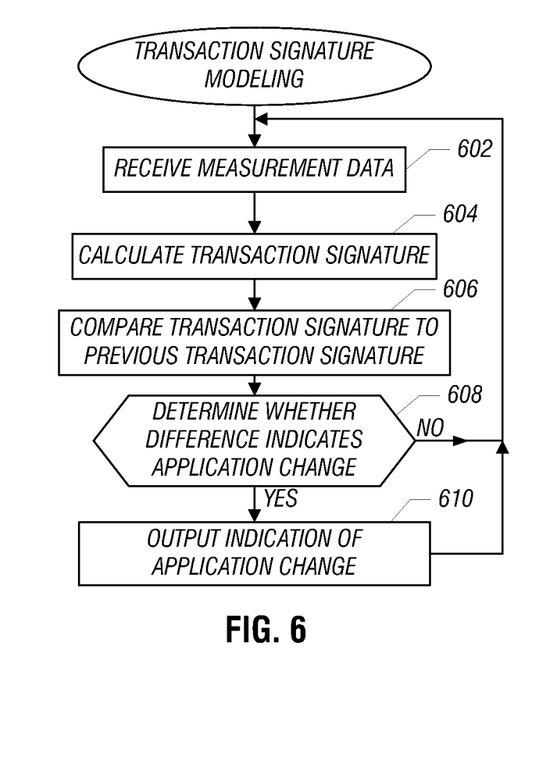
FIG. 6 is a flow diagram of a process of using transaction signatures to detect a change to an application, according to an embodiment.

A flow diagram of a process of performing application change detection using transaction signature modeling is shown in FIG. 6. The tasks can be performed by the online solver and analyzer 112, for example. Measurement data is received (at 602). The measurement data can be collected by the diagnostic probe 111. Based on the received measurement data, the present application transaction signature (Signature y) as discussed above is calculated (at 604). The present application transaction signature (Signature y) is compared (at 606) with a previous application transaction signature (Signature x) (which was previously calculated based on previously received measurement data).

The online solver and analyzer 112 determines (at 608) whether the difference between Signature y and Signature x indicates that there has been an application change. If not, the process returns to task 602 to repeat the procedure shown in FIG. 6. However, if the difference indicates that an application change has occurred, then an output indication is provided (at 610) of the application change. The process then continues to receive further measurement data and the procedure of FIG. 6 is repeated.

It is noted that in some embodiments, both the regression-based modeling algorithm and the application transaction signature modeling algorithm are used to provide an integrated framework. However, in other embodiments, just one or the other of the regression-based modeling algorithm and the application transaction signature modeling algorithm is used.

V. Application Log Cleansing

By using the regression-based modeling technique discussed above, an automatically cleansed application transaction log is produced. As discussed above, the regression-based modeling technique removes time segments within a given time interval T that are considered anomalous, based on one or more criteria.

If no application changes are present, then the entire application transaction log would be considered to be part of a single segment that is represented by a corresponding regression-based model (which can be a model that is a combination of corresponding segment models that represent respective time segments).

However, if one or more application changes are reflected in the log, then the log will have two or more distinct intervals corresponding to different regression-based models that represent different application behaviors due to application changes.

The one or more models that are derived from the cleansed application transaction log can be used for performing various tasks, such as capacity planning or resource provisioning for a present or future system.

In another embodiment, it is possible that the tasks associated with the regression-based modeling algorithm can be used to cleanse a application transaction log that contains data associated with anomalous segments. This provides an automated technique of cleansing application transaction logs.

VI. Processor-Based Execution of Software

Instructions of software described above (including the online solver and analyzer 112 and diagnostic probe 111 of FIG. 1) are loaded for execution on a processor (such as processor 114 or 132 in FIG. 1). The processor includes microprocessors, microcontrollers, processor modules or subsystems (including one or more microprocessors or microcontrollers), or other control or computing devices. As used here, a "processor" can refer to a single component or to plural components (e.g., one or multiple CPUs in one or multiple computers).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of modeling a computing entity, comprising:
   receiving information relating to transactions associated with the computing entity, wherein the received information forms a collection of information;
   segmenting, by at least one processor, the collection into a plurality of segments;
   identifying, by the at least one processor, at least one anomalous segment in the plurality of segments;
   filtering out the identified at least one anomalous segment;
   providing corresponding segment models representing the respective segments other than the filtered out at least one anomalous segment of the collection;
   combining the segment models for building a model of the computing entity;
   detecting that a change has been made to the computing entity in response to determining that combining the segment models results in an error greater than a predefined threshold;
   outputting the model of the computing entity in response to determining that combining the segment models does not result in error greater than the predefined threshold; and
   outputting distinct models in response to determining that combining the segment model results in the error greater than the predefined threshold, where the distinct models include a first model based on the segment models before a point corresponding to the change, and a second model based on the segment models after the point corresponding to the change.

2. The method of claim 1, wherein the collection of information comprises a time interval of information, and wherein segmenting the collection into the plurality of segments comprises segmenting the time interval into a plurality of time segments.

3. The method of claim 1, wherein segmenting the collection into the plurality of segments comprises finding a segmentation of the collection that optimizes a predefined function relating to utilization of a resource by the computing entity.

4. The method of claim 3, wherein finding the segmentation is further based on a penalty function that assigns penalties according to lengths of the segments.

5. The method of claim 1, wherein identifying the at least one anomalous segment is based on detecting that a parameter associated with the at least one anomalous segment exceeds a threshold, where the parameter represents one or more of: (1) idle activities of a system in which the computing entity runs, and (2) a length of the anomalous segment.

6. The method of claim 1, further comprising producing a cleansed log of transaction data for the computing entity, wherein the cleansed log is based on removing data associated with any anomalous segments.

7. The method of claim 1, wherein the receiving, segmenting, identifying, filtering, providing, combining, and detecting are performed as part of an online environment in which the model of the computing entity is continually updated as additional information relating to execution of the computing entity is received.

8. A computer comprising:
   storage media to store a collection of information regarding transactions performed by a computing entity;
   at least one processor to:
     receive information relating to transactions associated with the computing entity, wherein the received information forms a collection of information;
     segment the collection into a plurality of segments;
     identify at least one anomalous segment in the plurality of segments;
     provide corresponding segment models representing the respective segments other than the at least one anomalous segment of the collection;
     combine the segment models for building a model of the computing entity;
     detect that a change has been made to the computing entity in response to determining that combining the segment models results in an error greater than a predefined threshold;
     output the model of the computing entity in response to determining that combining the segment models does not result in error greater than the predefined threshold; and
     output distinct models in response to determining that combining the segment model results in error greater than the predefined threshold, where the distinct models include a first model based on the segment models before a point corresponding to the change, and a second model based on the segment models after the point corresponding to the change.

9. The computer of claim 8, wherein the at least one processor is configured to further:
identify one or more transactions of the computing entity that relate to the change.

10. The computer of claim 8, wherein the collection includes a time interval, and the plurality of segments include a plurality of time.

11. An article comprising at least one computer-readable storage medium containing instructions that upon execution cause a computer to:
divide data associated with transactions of a computing entity into a plurality of segments;
identify at least one of the segments as being anomalous;
provide segment models for corresponding ones of the plurality of segments other than the identified at least one anomalous segment;
perform reconciliation that includes combining the segment models to produce an overall model;
detect that a change has been made to the computing entity that prevents the overall model from being an accurate model of the computing entity in response to determining that combining the segment models results in an error greater than a predefined threshold;
output the overall model in response to determining that combining the segment models does not result in the error greater than the predefined threshold; and
output distinct models in response to determining that combining the segment model results in the error greater than the predefined threshold, where the distinct models include a first model based on the segment models before a time point corresponding to the change, and a second model based on the segment models after the time point corresponding to the change.

\* \* \* \* \*